United States Patent
Westerfeld et al.

(10) Patent No.: US 8,290,678 B2
(45) Date of Patent: Oct. 16, 2012

(54) BRAKE CONTROL METHOD AND BRAKE CONTROL DEVICE FOR TWO-WHEELED MOTOR VEHICLE

(75) Inventors: Helge Westerfeld, Yokohama (JP); Takahiro Ogawa, Yokohama (JP); Markus Hamm, Ismaning (DE)

(73) Assignee: Bosch Corporation, Tokyo (JP)

( * ) Notice: Subject to any disclaimer, the term of this patent is extended or adjusted under 35 U.S.C. 154(b) by 328 days.

(21) Appl. No.: 12/528,389

(22) PCT Filed: Feb. 21, 2008

(86) PCT No.: PCT/JP2008/052946
§ 371 (c)(1),
(2), (4) Date: Jan. 27, 2010

(87) PCT Pub. No.: WO2008/102844
PCT Pub. Date: Aug. 28, 2008

(65) Prior Publication Data
US 2010/0138122 A1 Jun. 3, 2010

(30) Foreign Application Priority Data
Feb. 23, 2007 (JP) .................. 2007-044077

(51) Int. Cl.
*G06F 7/70* (2006.01)
*G06F 19/00* (2006.01)
*G06G 7/00* (2006.01)
*G06G 7/76* (2006.01)

(52) U.S. Cl. ........................................... 701/70
(58) Field of Classification Search ............ 701/70
See application file for complete search history.

(56) References Cited

U.S. PATENT DOCUMENTS

| | | | |
|---|---|---|---|
| 5,324,102 A * | 6/1994 | Roll et al. | 303/137 |
| 5,618,088 A * | 4/1997 | Roll et al. | 303/158 |
| 6,238,017 B1 * | 5/2001 | Eitel | 303/137 |
| 6,378,961 B1 * | 4/2002 | Hara et al. | 303/193 |
| 8,070,237 B2 * | 12/2011 | Ogawa et al. | 303/9.64 |
| 2003/0122419 A1* | 7/2003 | Sakamoto | 303/166 |
| 2005/0067892 A9* | 3/2005 | Heubner et al. | 303/113.5 |
| 2005/0168063 A1 | 8/2005 | Tani et al. | |
| 2006/0138858 A1* | 6/2006 | Nakayama et al. | 303/9.64 |

FOREIGN PATENT DOCUMENTS
DE 102005054557 A1 5/2006
(Continued)

*Primary Examiner* — Mary Cheung
*Assistant Examiner* — Michael D Lang
(74) *Attorney, Agent, or Firm* — Michael Best & Friedrich LLP (57) ABSTRACT

To further improve, in a brake control method and device for a two-wheeled motor vehicle that utilizes a wheel cylinder pressure as a parameter for predicting the potential for lifting of a rear wheel, the accuracy of predicting lifting of the rear wheel.
A brake control method of the present invention comprises the steps of inputting a signal of an input sensor (step 100); detecting a front wheel cylinder pressure (step 102); detecting an amount of change in the front wheel cylinder pressure (step 104); determining whether or not the front wheel cylinder pressure and the amount of change in the front wheel cylinder pressure that have been detected correspond to a brake condition where lifting of a rear wheel can occur (step 106); and, when it is determined that the front wheel cylinder pressure and the amount of change in the front wheel cylinder pressure that have been detected correspond to the brake condition, reducing a pressure amplification gradient of the front wheel cylinder pressure.

12 Claims, 4 Drawing Sheets

FOREIGN PATENT DOCUMENTS

| | | |
|---|---|---|
| JP | 5201317 A | 8/1993 |
| JP | 200229397 A | 1/2002 |
| JP | 2003191832 A | 7/2003 |
| JP | 2005212677 A | 8/2005 |
| JP | 2007269290 A | 10/2007 |
| WO | 2007088590 A1 | 8/2007 |

* cited by examiner

BRAKE CONTROL METHOD AND BRAKE CONTROL DEVICE FOR TWO-WHEELED MOTOR VEHICLE

TECHNICAL FIELD

The present invention relates to a brake control method and a brake control device for a two-wheeled motor vehicle.

BACKGROUND ART

In order to prevent rear wheel lifting caused by sudden brake operation with respect to a front wheel in a two-wheeled motor vehicle, there is known, for example, the technology described in patent document 1 below.

The technology in patent document 1 utilizes the fact that, when a wheel angular acceleration $\alpha$ is 0, brake force expressed as a predetermined function of a wheel cylinder pressure (caliper pressure) and road surface frictional force expressed as a product of a road surface $\mu$ and a vertical load W match to estimate and calculate vertical loads $W_{FR}$ and $W_{RR}$ acting on the front and rear wheels on the basis of a front wheel cylinder pressure and a rear wheel cylinder pressure that have been detected. In this estimation calculation, the technology utilizes the fact that the sum of the vertical loads $W_{FR}$ and $W_{RR}$ is constant to eliminate the road surface $\mu$ that is an unknown. Additionally, when it has been judged that, during brake operation of the front wheel, the vertical load $W_{RR}$ on the rear wheel that has been estimated has fallen below the matching value, the technology reduces the front wheel cylinder pressure (caliper pressure) to thereby appropriately alleviate the drop in the vertical load $W_{RR}$ on the rear wheel.

However, in the above-described technology, under a condition where the assumption that the wheel angular acceleration $\alpha$ is 0 is not established, such as when the wheel cylinder pressures abruptly change or when the wheels actually skid, there is the potential for the estimated value of the vertical load $W_{RR}$ on the rear wheel to become inaccurate; thus, under such a condition, there is the fear that prevention of rear wheel lifting will no longer be certain.

Patent Document 1: JP-A-5-77700

DISCLOSURE OF THE INVENTION

Problems to be Solved by the Invention

The present invention has been made in view of this circumstance, and it is an object thereof to further improve, in a brake control method and device for a two-wheeled motor vehicle that utilizes a wheel cylinder pressure as a parameter for predicting the potential for lifting of a rear wheel, the accuracy of predicting the lifting of the rear wheel.

Means for Solving the Problems

In order to solve the above-described problem, a brake control method for a two-wheeled motor vehicle pertaining to an aspect of the present invention comprises the steps of: detecting a front wheel cylinder pressure; detecting an amount of change in the front wheel cylinder pressure; determining whether or not the front wheel cylinder pressure and the amount of change in the front wheel cylinder pressure that have been detected correspond to a brake condition where lifting of a rear wheel can occur; and, when it is determined that the front wheel cylinder pressure and the amount of change in the front wheel cylinder pressure that have been detected correspond to the brake condition, limiting the increase of the front wheel cylinder pressure. In the step of limiting the increase of the front wheel cylinder pressure, a pressure amplification gradient of the front wheel cylinder pressure can be reduced.

According to the above-described aspect of the present invention, the method uses not only the front wheel cylinder pressure but also the amount of change in the front wheel cylinder pressure to determine the lifting of the rear wheel, so in comparison to the prior art, the accuracy of predicting the lifting of the rear wheel under an extensive condition can be further improved.

Preferably, the brake control method further comprises the step of determining beforehand a function of the amount of change in the front wheel cylinder pressure that relates to the front wheel cylinder pressure in order to determine the brake condition. Further, in the determining step, when the state determined by the front wheel cylinder pressure and the amount of change in the front wheel cylinder pressure is in a region that exceeds a boundary demarcated by the function it is judged that the state corresponds to the brake condition. By finely setting this function in accordance with factors that cause rear wheel lifting in a two-wheeled motor vehicle, there can be provided a brake control method for preventing rear wheel lifting corresponding to various vehicle body conditions.

For example, it is preferable for the function to include at least one negative gradient section where the amount of change in the wheel cylinder pressure decreases with respect to an increase in the front wheel cylinder pressure. Further, the function may also include two or more negative gradient sections that are respectively different, and in this case, it is preferable for the section demarcated by a region of the front wheel cylinder pressure that is higher of the two or more negative gradient sections to have a decrease gradient that is steeper than that of the section demarcated by a region of the front wheel cylinder pressure that is lower.

Preferably, it is ensured that, when the front wheel cylinder pressure is equal to or less than a first threshold, the step of reducing the pressure amplification gradient of the front wheel cylinder pressure is not executed regardless of the amount of change in the front wheel cylinder pressure.

The function may also include a constant gradient section where, when the front wheel cylinder pressure is equal to or greater than a second threshold, the amount of change in the front wheel cylinder pressure becomes constant with respect to an increase in the front wheel cylinder pressure.

A brake control device pertaining to another aspect of the present invention comprises: pressure detecting means for detecting a front wheel cylinder pressure; pressure change amount detecting means for detecting an amount of change in the front wheel cylinder pressure; determining means for determining whether or not the front wheel cylinder pressure and the amount of change in the front wheel cylinder pressure that have been detected correspond to a brake condition where lifting of a rear wheel can occur; and brake control means for limiting the increase of the front wheel cylinder pressure when it is determined that the front wheel cylinder pressure and the amount of change in the front wheel cylinder pressure that have been detected correspond to the brake condition.

Preferably, the brake control device further comprises storage means that stores a function of the amount of change in the front wheel cylinder pressure that relates to the front wheel cylinder pressure in order to determine the brake condition.

EXPLANATION OF THE REFERENCE NUMERALS

1 Front Brake Master Cylinder
2 Rear Brake Master Cylinder
3 Front Wheel Cylinder
4 Rear Wheel Cylinder
16 Front Reservoir
24 Rear Reservoir
35 Brake Handle
36 Brake Pedal
47 Pressure Sensor
51 Electronic Control Unit (ECU)
101 Hydraulic Unit

EMBODIMENT

Hereinafter, a description will be given of embodiments of the invention with reference to the drawings.

Figure 1:
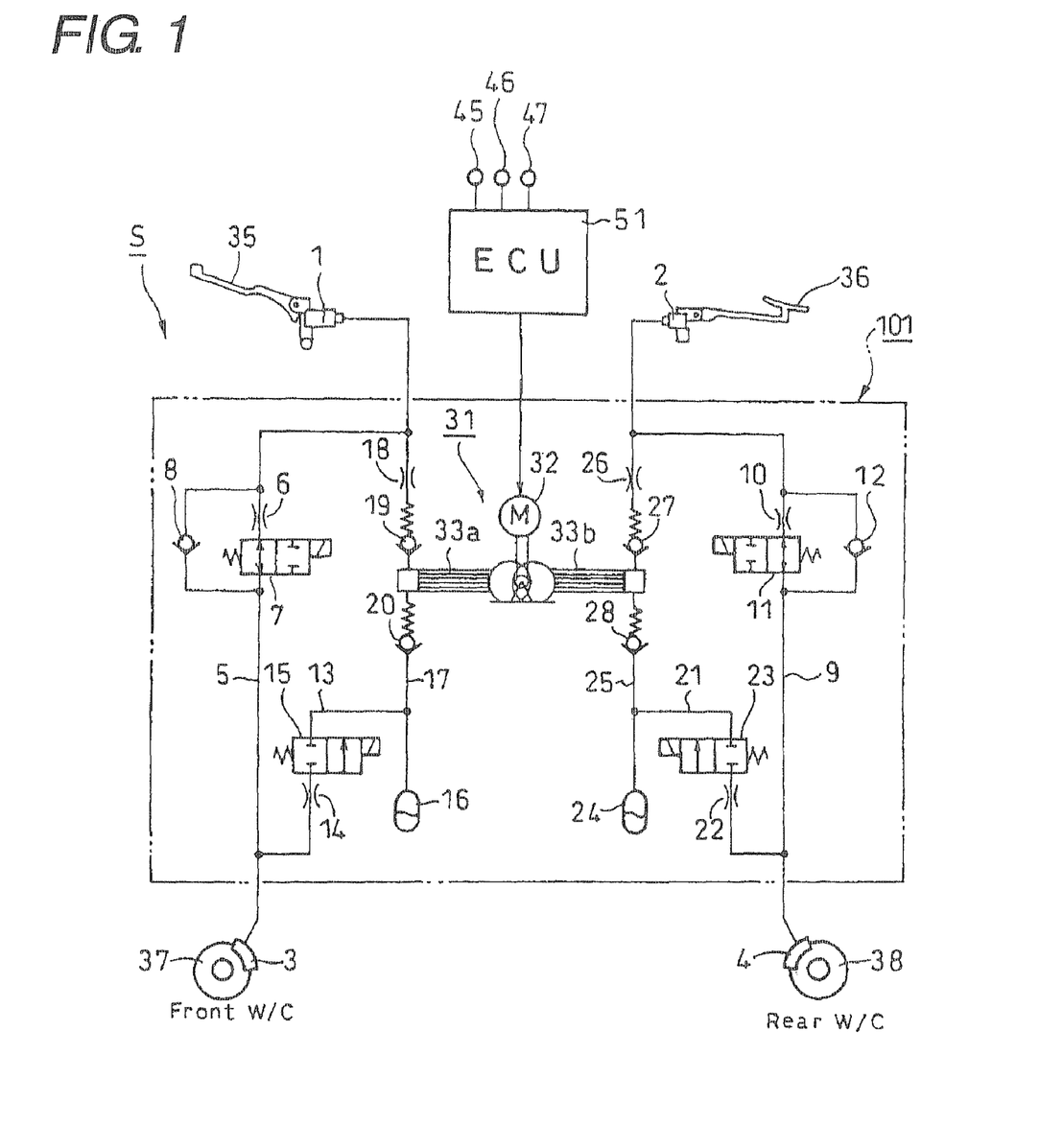
FIG. 1 is a general configural diagram of a brake control device pertaining to an embodiment of the present invention.

In FIG. 1, there is shown an example of the configuration of a brake control device S pertaining to an embodiment of the present invention. The brake control device S is equipped with a front brake master cylinder 1 that is disposed so as to be capable of converting operation force of a brake handle 35 serving as a first brake operator into hydraulic pressure, a rear brake master cylinder 2 that is disposed so as to be capable of converting operation force of a brake pedal 36 serving as a second brake operator into hydraulic pressure, a front wheel cylinder 3 that applies brake force to a front wheel 37 in response to hydraulic pressure from the front brake master cylinder 1, a rear wheel cylinder 4 that applies brake force to a rear wheel 38 in response to hydraulic pressure from the rear brake master cylinder 2, a hydraulic unit 101 that is disposed between the front and rear brake master cylinders 1 and 2 and the front and rear wheel cylinders 3 and 4, an electronic control unit 51, wheel speed sensors 45 and 46, and a pressure sensor 47. An antilock brake control device is configured by the wheel speed sensors 45 and 46, the pressure sensor 47, the electronic control unit 51 and the hydraulic unit 101.

The front brake master cylinder 1 and the front wheel cylinder 3 are interconnected by a first main hydraulic pipe 5, and a front main hydraulic pipe-use throttle 6 and a first electromagnetic valve 7 are disposed in the middle of this first main hydraulic pipe 5 in the order from the front brake master cylinder 1 side. This first electromagnetic valve 7 is ordinarily open. Moreover, a front main hydraulic pipe-use check valve 8 whose forward direction is the flow of brake oil (brake fluid) from the front wheel cylinder 3 to the front brake master cylinder 1 is disposed so as to bypass the front main hydraulic pipe-use throttle 6 and the first electromagnetic valve 7.

Similarly, the rear brake master cylinder 2 and the rear wheel cylinder 4 are interconnected by a second main hydraulic pipe 9, and a rear main hydraulic pipe-use throttle 10 and a second electromagnetic valve 11 are disposed in the middle of this second main hydraulic pipe 9 in the order from the rear brake master cylinder 2 side. This second electromagnetic valve 11 is ordinarily open. Moreover, a rear main hydraulic pipe-use check valve 12 whose forward direction is the flow of brake oil from the rear wheel cylinder 4 to the rear brake master cylinder 2 is disposed so as to bypass the rear main hydraulic pipe-use throttle 10 and the second electromagnetic valve 11.

Further, a front reservoir connection-use hydraulic pipe 13 is connected in an appropriate position of the first main hydraulic pipe 5 between the first electromagnetic valve 7 and the front wheel cylinder 3, a front reservoir-use throttle 14 and a front reservoir inflow control-use electromagnetic valve 15 are disposed in the middle of the front reservoir connection-use hydraulic pipe 13 in the order from the front wheel cylinder 3 side, and a front reservoir 16 is connected via these. This front reservoir inflow control-use electromagnetic valve 15 is ordinarily closed.

Moreover, a front return-use hydraulic pipe 17 that is communicated with the front brake master cylinder 1 is connected to the front reservoir connection-use hydraulic pipe 13 at a position between the front reservoir inflow control-use electromagnetic valve 15 and the front reservoir 16, and a front return path-use throttle 18, a first front return path-use check valve 19 and a second front return path-use check valve 20 are disposed in the middle of the front return path-use hydraulic pipe 17 in the order from the front brake master cylinder 1 side.

Further, basically similar to the configuration in the aforementioned first main hydraulic pipe 5, a rear reservoir connection-use hydraulic pipe 21 is connected in an appropriate position of the second main hydraulic pipe 9 between the second electromagnetic valve 11 and the rear wheel cylinder 4, a rear reservoir-use throttle 22 and a rear reservoir inflow control-use electromagnetic valve 23 are disposed in the middle of the rear reservoir connection-use hydraulic pipe 21 in the order from the rear wheel cylinder 4 side, and a rear reservoir 24 is connected via these. This rear reservoir inflow control-use electromagnetic valve 23 is ordinarily closed.

Moreover, a rear return-use hydraulic pipe 25 that is communicated with the rear brake master cylinder 2 is connected to the rear reservoir connection-use hydraulic pipe 21 at an appropriate position between the rear reservoir inflow control-use electromagnetic valve 23 and the rear reservoir 24, and a rear return path-use throttle 26, a first rear return path-use check valve 27 and a second rear return path-use check valve 28 are disposed in the middle of the rear return path-use hydraulic pipe 25 in the order from the rear brake master cylinder 2 side.

Moreover, a hydraulic pump device 31 that is shared between the front brake and the rear brake is disposed in the hydraulic unit 101. That is, the hydraulic pump device 31 is generally configured by a motor 32 and two plungers 33a and 33b that are reciprocally moved by fixed cams (not shown) that are fixedly attached to an output shaft (not shown) of this motor 32.

The one plunger 33a is connected between the first front return path-use check valve 19 and the second front return path-use check valve 20, the other plunger 33b is connected between the first rear return path-use check valve 27 and the second rear return path-use check valve 28, and because of the reciprocal movement of the plungers 33a and 33b, brake oil in the front reservoir 16 is sucked up and refluxed to the front brake master cylinder 1 while brake oil in the rear reservoir 24 is sucked up and refluxed to the rear brake master cylinder 2.

Control of operation of each of the first and second electromagnetic valves 7 and 11, the front reservoir inflow control-use electromagnetic valve 15, the rear reservoir inflow control-use electromagnetic valve 23 and the motor 32 is executed by the electronic control unit (in FIG. 1, notated as "ECU") 51.

The electronic control unit 51 is configured to include memory elements (not shown) such as a RAM and a ROM in a microcomputer (not shown) that has a publicly known/commonly known configuration.

This electronic control unit 51 performs wheel speed calculation, processing to control the electromagnetic valves and the motor for lock prevention control, monitor processing for determining whether or not there is an abnormality in the wheel speed sensors and the like, rear wheel lifting detection processing pertaining to the embodiment of the present invention, and brake control processing accompanying rear wheel lifting detection.

Detection signals of the wheel speed sensor 45 for detecting the wheel speed of the front wheel 37, the wheel speed sensor 46 for detecting the wheel speed of the rear wheel 38 and the pressure sensor 47 that detects the generated pressure of the front wheel cylinder 3 are inputted to the electronic control unit 51 in order to execute the aforementioned control processing. The pressure sensor 47 can be attached to an arbitrary place other than to the first main hydraulic pipe 5 as long as it is a place that is pressure-communicated with the first main hydraulic pipe 5, and the pressure sensor 47 may also be attached either inside the hydraulic unit 101 or to the front wheel cylinder 3.

Moreover, detection signals of a brake lever actuation switch (not shown) that detects actuation of the brake handle 35 and a brake pedal actuation switch (not shown) that detects actuation of the brake pedal 36 are also inputted to the electronic control unit 51.

Further, a motor drive circuit (not shown) that generates and outputs a drive signal with respect to the motor 32 is disposed inside the electronic control unit 51.

Further still, an electromagnetic valve drive circuit (not shown) that controls the driving of the first and second electromagnetic valves 7 and 11, the front reservoir inflow control-use electromagnetic valve 15 and the rear reservoir inflow control-use electromagnetic valve 23 is disposed inside the electronic control unit 51.

In the brake control device S that has the aforementioned configuration, when the brake handle 35 is operated, a detection signal corresponding to the fact that the operation was detected is inputted to the electronic control unit 51 by the brake lever actuation switch (not shown) that detects the operation of the brake handle 35. At the same time, brake fluid of a hydraulic pressure corresponding to the operation of the brake handle 35 is supplied to the front wheel cylinder 3 from the brake master cylinder 1, brake force is generated, and the brake force acts on the wheel 37.

In the electronic control unit 51, when it is judged that antilock brake control is necessary, the first electromagnetic valve 7 is excited, the first main hydraulic pipe 5 is placed in a non-communicated state, and the hydraulic pressure of the front wheel cylinder 3 is held at a constant. Additionally, in the electronic control unit 51, when it is judged that the brake should be eased up on, the front reservoir inflow control-use electromagnetic valve 15 is excited. As a result, the brake fluid in the front wheel cylinder 3 is discharged to the front reservoir 16 via the front reservoir inflow control-use electromagnetic valve 15 such that the brake is eased up on.

At the same time, the motor 32 is driven by the unillustrated motor drive circuit inside the electronic control unit 51 such that the brake fluid stored in the front reservoir 16 is sucked up by the movement of the plunger 33a and is refluxed to the front brake master cylinder 1.

In a case where the brake pedal 36 is operated, brake force corresponding to the wheel 33 is obtained and alleviation of the brake force is achieved in basically the same manner as in the case of the brake handle 35. Other basic operation of the electronic control unit 51 is the same as publicly known/commonly known brake control devices except for the operation that is characteristic of the present invention described below, so detailed description will be omitted.

Next, the action of the brake control device S pertaining to the embodiment of the present invention will be described using FIG. 2 to FIG. 5.

Figure 2:
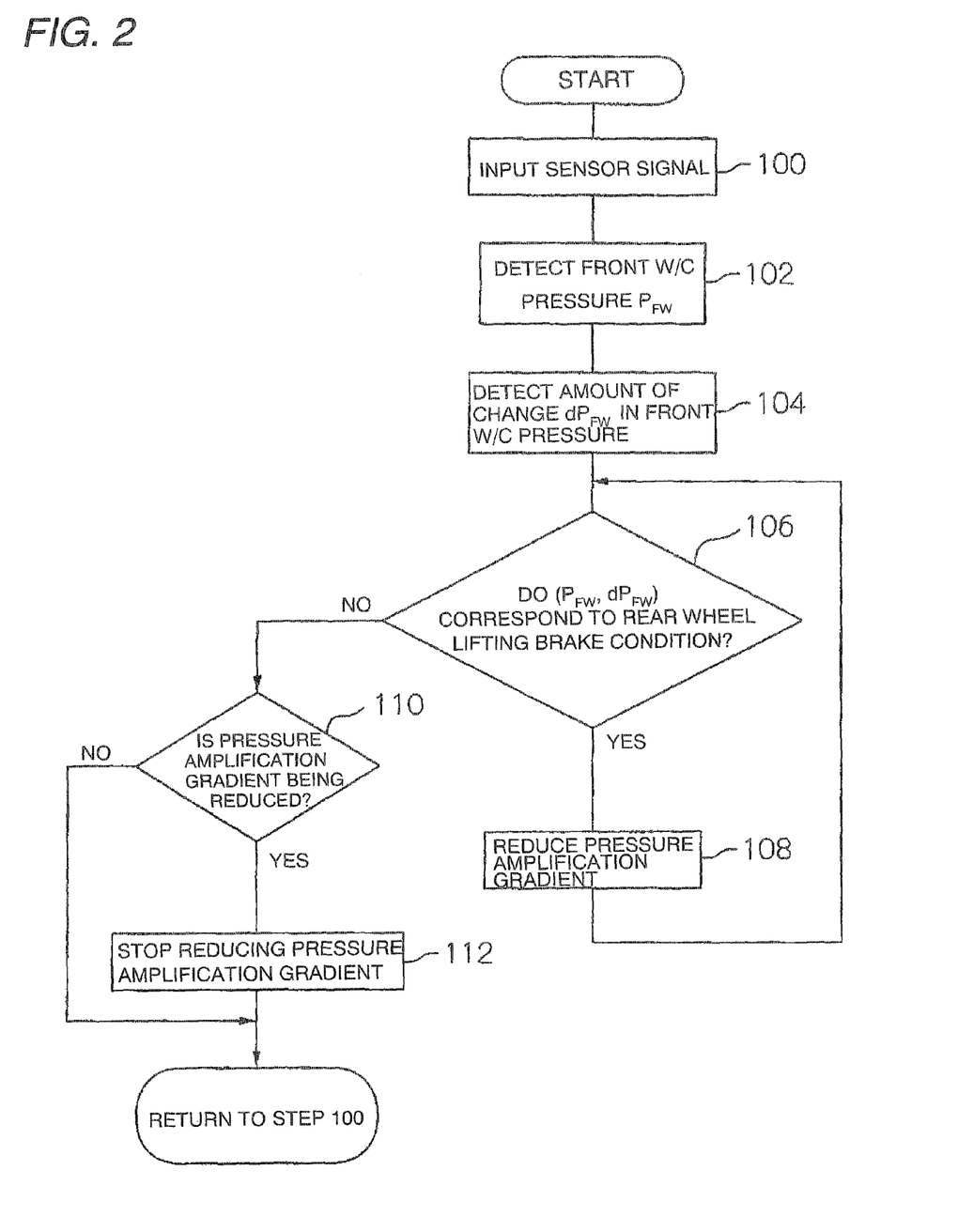
FIG. 2 is a flowchart showing a processing sequence of brake control for rear wheel lifting prevention that is executed by an electronic control unit of the brake control device shown in FIG. 1.

In FIG. 2, there is shown a flowchart of a processing sequence of brake control for rear wheel lifting prevention that is executed by the electronic control unit 51 shown in FIG. 1. As shown in the same drawing, first, a sensor signal that has been outputted from the pressure sensor 47 is inputted to the ECU 51 (step 100). The ECU 51 detects a front wheel cylinder pressure $P_{FW}$ on the basis of the sensor signal that has been inputted (step 102; in the drawing, wheel cylinder is notated as "W/C"). Moreover, the ECU 51 detects an amount of change $dP_{FW}$ in the front wheel cylinder pressure on the basis of the front wheel cylinder pressure $P_{FW}$ (step 104). This amount of change $dP_{FW}$ in the front wheel cylinder pressure can, for example, be calculated by the following expression.

$$dP_{FW}=(P_{FW2}-P_{FW1})/\Delta t$$

Here, $P_{FW1}$ is a front wheel cylinder pressure that has been detected at a certain time $S_1$, and $P_{FW2}$ is a front wheel cylinder pressure that has been detected at a time $S_2$ after the elapse of $\Delta t$ from the time $S_1$ ($S_2=S_1+\Delta t$).

Next, the ECU 51 determines whether or not the front wheel cylinder pressure $P_{FW}$ and the amount of change $dP_{FW}$ in the front wheel cylinder pressure that have been detected correspond to a rear wheel lifting brake condition (step 106). When the ECU 51 determines that the wheel cylinder pressure states ($P_{FW}$, $dP_{FW}$) correspond to the rear wheel lifting brake condition (YES determination in step 106), the ECU 51 moves to the processing of the next step 108, in which a pressure amplification gradient of the pressure (wheel cylinder pressure) of the front wheel cylinder 3 is forcibly reduced. Thereafter, the ECU 51 returns to step 106 and repeats the same processing.

Figure 5:
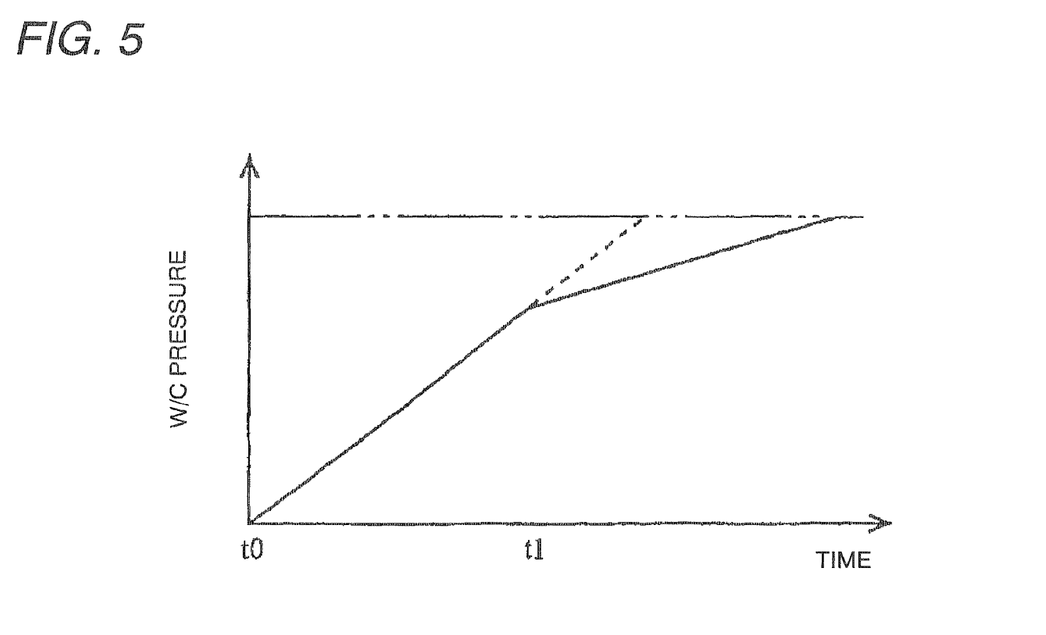
FIG. 5 is a characteristic line diagram generally showing an example of a change in the wheel cylinder pressure when a step of reducing a pressure amplification gradient of a front wheel cylinder pressure in the brake control for rear wheel lifting prevention in FIG. 2 has been executed.

In step 108, more specifically, the first electromagnetic valve 7 is controlled to open and close by a signal from the unillustrated electromagnetic valve drive circuit of the electronic control unit 51 such that by limiting the supply of brake oil to the front cylinder 3, the pressure amplification gradient of the wheel cylinder pressure is reduced. Here, FIG. 5 shows an example of a general change in the wheel cylinder pressure in the step (step 108) of reducing the pressure amplification gradient. In the same drawing, the horizontal axis is a time axis, and the vertical axis represents the front wheel cylinder pressure (in FIG. 5, noted as "W/C pressure"), or in other words brake pressure. As shown in FIG. 5, a state where, from time $t_0$ to $t_1$, the wheel cylinder pressure steeply increases because of abrupt brake operation is represented by a solid characteristic line. At time $t_1$, it is determined that there is the potential for rear wheel lifting, and forced reduction of the pressure amplification gradient of the wheel cylinder pressure as described above is started. From time $t_1$ onward, the wheel cylinder pressure is changed slowly in comparison to the pressure before then.

Step 106 in FIG. 2 will be referred to again now. When the ECU 51 determines that the wheel cylinder pressure states ($P_{FW}$, $dP_{FW}$) do not correspond to the rear wheel lifting brake condition (NO determination in step 106), the ECU 51 moves to the processing of the next step 110. In step 110, the ECU 51 determines whether or not the pressure amplification gradient reducing step of step 108 is in the middle of operation. When the pressure amplification gradient reducing step is in the middle of operation (YES determination in step 110), the ECU 51 stops the pressure amplification gradient reducing processing (step 112), again returns to step 100, and repeats the same processing. When the pressure amplification gradient reducing step is not in the middle of operation (NO determination in step 110), the ECU 51 again returns to step 100 and repeats the same processing without going through step 112.

Figure 3:
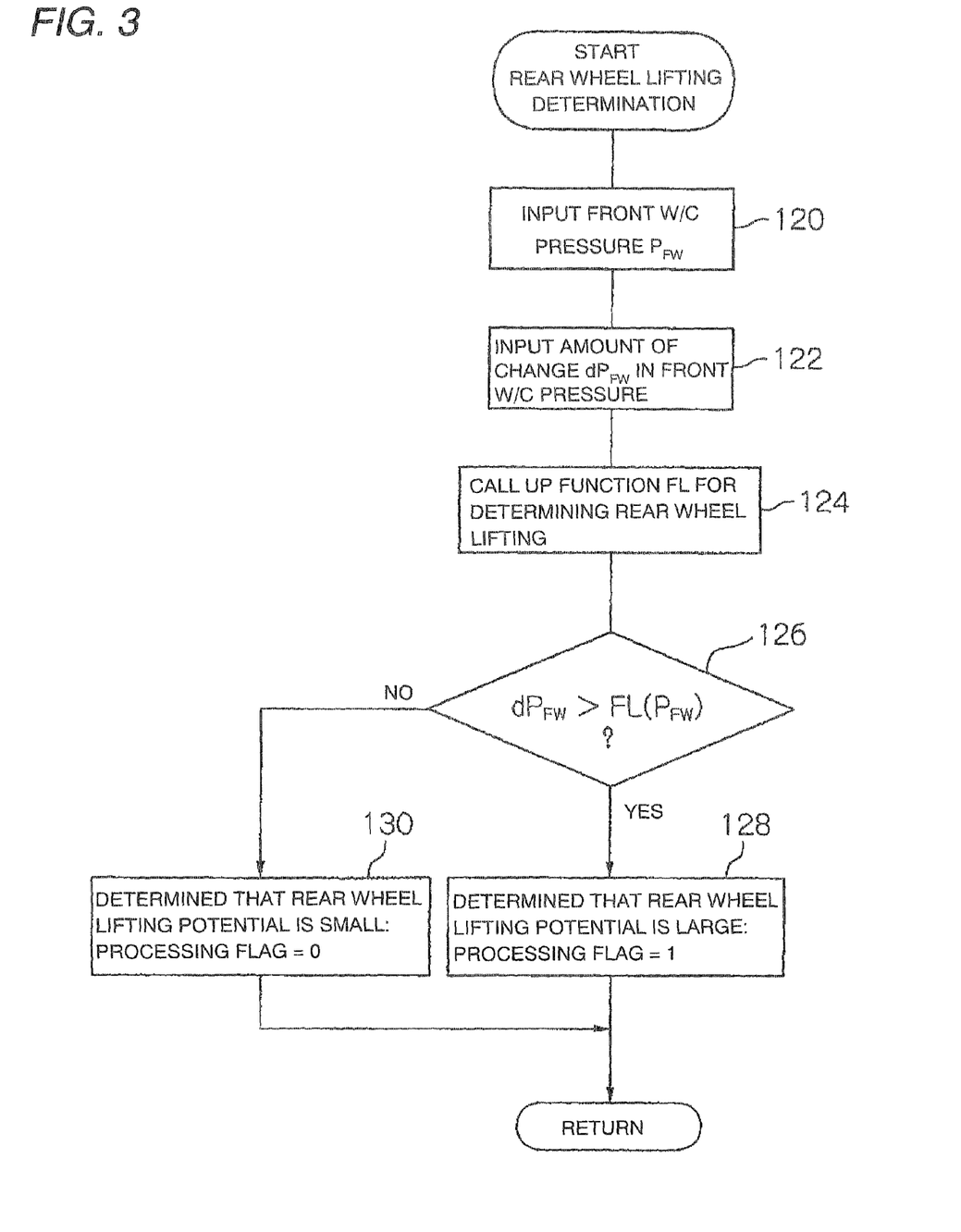
FIG. 3 is a sub-routine flowchart showing a detailed processing sequence of a rear wheel lifting determining step in FIG. 2.

The rear wheel lifting determining step of step 106 in FIG. 2 can, for example, be accomplished by executing the sub-routine shown in FIG. 3.

As shown in FIG. 3, first, the ECU 51 delivers and inputs as an argument to the sub-routine in FIG. 3 the front wheel cylinder pressure $P_{FW}$ and the amount of change $dP_{FW}$ in the front wheel cylinder pressure that have been determined by the ECU 51 in steps 102 and 104 in FIG. 2 (steps 120, 122).

Next, the ECU 51 calls up a rear wheel lifting determining function FL (step 124). This determining function FL is defined as a function of the amount of change $dP_{FW}$ in the front cylinder pressure with respect to the arbitrary front wheel cylinder pressure $P_{FW}$ as in the following expression.

$$dP_{FW} = FL(P_{FW})$$

Figure 4:
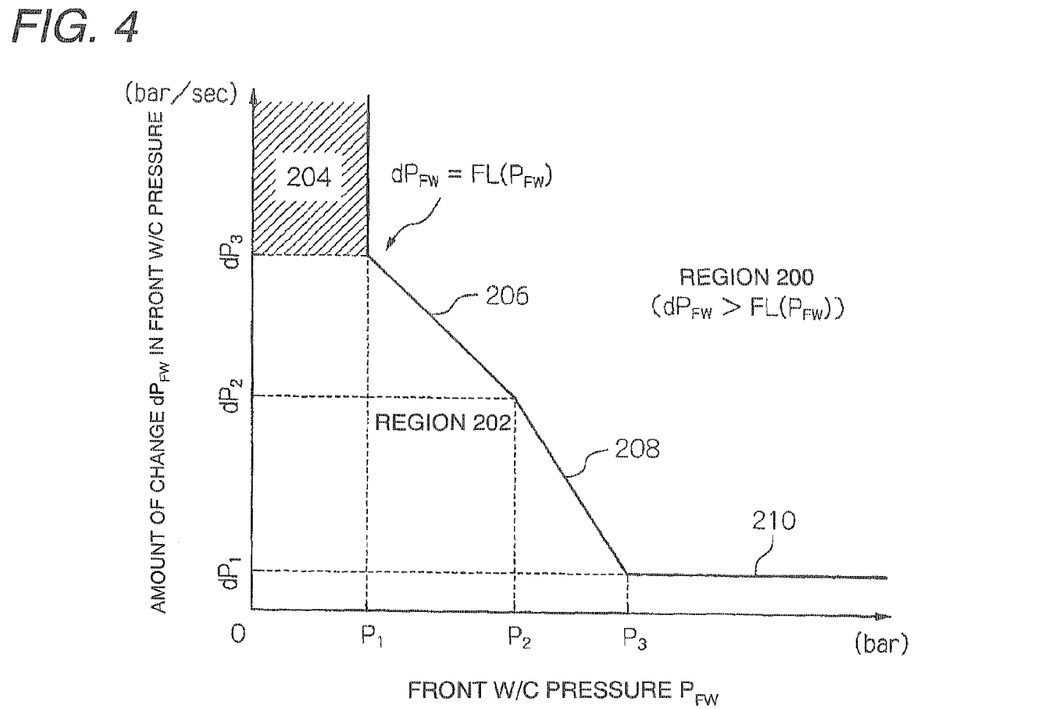
FIG. 4 is a function diagram of an amount of change in a wheel cylinder pressure with respect to a wheel cylinder pressure showing an example of a function for determining rear wheel lifting.

A specific example of this determining function FL is shown in FIG. 4.

FIG. 3 will be referred to again now with reference to FIG. 4. In step 126 in FIG. 3, the actual wheel cylinder pressure states ($P_{FW}$, $dP_{FW}$) that have been inputted in steps 120 and 122 are classified as belonging to either a region 200 in FIG. 4 where $dP_{FW} > FL(P_{FW})$ or a region 202 in FIG. 4 where $dP_{FW} \leq FL(P_{FW})$, with the determining function FL serving as a boundary.

Because it becomes easier for rear wheel lifting to occur when the front brake operation is abrupt, that is, the amount of change in the wheel cylinder pressure is large, when the wheel cylinder pressure states ($P_{FW}$, $dP_{FW}$) belong to the region 200 (YES determination in step 126), the ECU 51 determines that the potential for rear wheel lifting is large, sets the processing flag to 1 (step 128) and returns the present sub-routine. In contrast, when the wheel cylinder pressure states ($P_{FW}$, $dP_{FW}$) belong to the region 202, the ECU 51 determines that the potential for rear wheel lifting is low, sets the processing flag to 0 (step 130) and returns the present sub-routine.

When the processing flag is 1, the pressure amplification gradient reducing step is executed in step 108 in FIG. 2, and when the processing flag is 0, the pressure amplification gradient reducing step is not executed or the pressure amplification gradient reducing step is stopped in step 112 in FIG. 2.

Next, the determining function FL will be described in detail with reference to FIG. 4. The higher the front wheel cylinder pressure becomes, the easier it becomes for rear wheel lifting to occur even with a small amount of change in the wheel cylinder pressure, so the determining function FL should have at least one negative gradient section where the amount of change in the wheel cylinder pressure decreases with respect to an increase in the front wheel cylinder pressure. In the embodiment in FIG. 4, the determining function FL includes two negative gradient sections 206 and 208. Of course, the determining function FL may also include three or more negative gradient sections.

The negative gradient section 206 includes a linear gradient where the amount of change in the wheel cylinder pressure decreases from $dP_3$ (e.g., 300 bar/sec) to $dP_2$ (e.g., 160 bar/sec) between a wheel cylinder pressure $P_1$ (e.g., 4 bar) and a wheel cylinder pressure $P_2$ (e.g., 9 bar). The negative gradient section 208 has a linear gradient where the amount of change in the wheel cylinder pressure decreases from $dP_2$ (e.g., 160 bar/sec) to $dP_1$ (e.g., 35 bar/sec) between the wheel cylinder pressure $P_2$ (e.g., 9 bar) and a wheel cylinder pressure $P_3$ (e.g., 13 bar), and the negative gradient section 208 has a steeper gradient in comparison to the negative gradient section 206. The determining function pertaining to the present invention is not limited to this example, and the gradient in each section is appropriately set to a value that is suitable in terms of predicting lifting of the rear wheel. Further, the negative gradient sections do not always have to be linear, and they may also be formed by sections with curves, sections with plural and different curves, or plural linear sections that approximate curves.

Further, in FIG. 4, regions where the front wheel cylinder pressure is equal to or less than $P_1$ all belong to region 202. That is, this region is a region where the ECU 51 does not execute the aforementioned step of reducing the pressure amplification gradient of the front wheel cylinder pressure regardless of the amount of change in the front wheel cylinder pressure. Normally, even when the wheel cylinder pressure is low, if the amount of change in the wheel cylinder pressure is large, there is the potential for rear wheel lifting, but when the brake is suddenly applied, or in other words when the amount of change in the front wheel cylinder pressure is large, the tendency for the front wheel to lock becomes stronger, and antilock brake operation can be started. The wheel cylinder pressure is reduced by this antilock brake operation, so in region 204 (the diagonal line region of region 202) in FIG. 4, there is no longer the need for the ECU 51 to execute the pressure amplification gradient reducing step of step 108 in FIG. 2. The ECU 51 monitors the tendency for the wheel to lock in accordance with the state of rotation of each wheel, so antilock brake operation can be executed at the time of wheel lock detection regardless of whatever region in FIG. 4 the front wheel cylinder pressure belongs to.

Moreover, in FIG. 4, the determining function FL includes a constant gradient section 210 where, when the front wheel cylinder pressure is equal to or greater than $P_3$, the amount of change in the front wheel cylinder pressure becomes constant with respect to an increase in the front wheel cylinder pressure. This deals with the fact that the potential for lifting of the rear wheel is large when the front wheel cylinder pressure is already sufficiently large and one wishes to further increase, even if slightly, the front wheel cylinder pressure.

The determining function FL is stored in the ROM (not shown) or the like inside the ECU 51, but the type of the function and the numerical value and the like of the aforementioned function can be determined in accordance with the lifting characteristic of the rear wheel that is dependent on the type and the like of the two-wheeled vehicle. Particular examples of important factors for determining the function include the strength of the front fork of the two-wheeled motor vehicle, the ease with which the two-wheeled motor vehicle sinks (the characteristics of the dampers and the shock absorbers), the height of the center of gravity of the vehicle body, the area of the pistons in the brake calipers, and the coefficient of friction of the brake pads.

The above is the embodiment of the present invention, but the present invention is not limited to the above-described example and can be arbitrarily suitably changed within a scope that does not depart from the scope of the present invention set forth in the claims. For example, the pressure amplification gradient reducing step in step 108 in FIG. 2 is not limited to the brake force control shown in FIG. 5, and control to temporally and asymptotically reduce the pressure amplification gradient, control to simply hold the wheel cylinder pressure at a constant, or control such as simply reducing the wheel cylinder pressure to a constant pressure are also possible. Further, there may also be disposed a negative gradient section where the front wheel cylinder pressure is at least one of equal to or less than a first threshold or equal to or greater than a second threshold and where the amount of change in the wheel cylinder pressure with respect to an increase in the front wheel cylinder pressure decreases.

The invention claimed is:

1. A brake control method for a two-wheeled motor vehicle, comprising the steps of:
    detecting a front wheel cylinder pressure;
    detecting an amount of change in the front wheel cylinder pressure;
    determining whether or not the front wheel cylinder pressure and the amount of change in the front wheel cylinder pressure that have been detected correspond to a brake condition where lifting of a rear wheel can occur; and
    limiting increase of the front wheel cylinder pressure when it has been determined that the front wheel cylinder pressure and the amount of change in the front wheel cylinder pressure that have been detected correspond to the brake condition,
    wherein in said determining, when the state determined by the front wheel cylinder pressure and the amount of change in the front wheel cylinder pressure that have been detected is in a region that exceeds a boundary demarcated by a predetermined function of the amount of change in the front wheel cylinder pressure that relates to the front wheel cylinder pressure, it is judged that the state corresponds to the brake condition, the functions including at least one negative gradient section where the amount of change in the wheel cylinder pressure decreases with respect to an increase in the front wheel cylinder pressure.

2. The brake control method according to claim 1, wherein the function includes two or more of the negative gradient sections that are respectively different.

3. The brake control method according to claim 2, wherein the section demarcated by a region of the front wheel cylinder pressure that is higher of the two or more negative gradient sections has a decrease gradient that is steeper than that of the section demarcated by a region of the front wheel cylinder pressure that is lower.

4. The brake control method according to claim 1, wherein when the front wheel cylinder pressure is equal to or less than a first threshold, the step of limiting the increase of the front wheel cylinder pressure is not executed regardless of the amount of change in the front wheel cylinder pressure.

5. The brake control method according to claim 1, wherein the function includes a constant gradient section where, when the front wheel cylinder pressure is equal to or greater than a second threshold, the amount of change in the front wheel cylinder pressure becomes constant with respect to an increase in the front wheel cylinder pressure.

6. The brake control method according to claim 1, wherein the step of limiting the increase of the front wheel cylinder pressure reduces the pressure amplification gradient of the front wheel cylinder pressure.

7. A brake control device comprising:
    pressure detecting means for detecting a front wheel cylinder pressure;
    pressure change amount detecting means for detecting an amount of change in the front wheel cylinder pressure;
    determining means for determining whether or is not the front wheel cylinder pressure and the amount of change in the front wheel cylinder pressure that have been detected correspond to a brake condition where lifting of a rear wheel can occur;
    brake control means for limiting increase of the front wheel cylinder pressure when it is determined that the front wheel cylinder pressure and the amount of change in the front wheel cylinder pressure that have been detected correspond to the brake condition, and
    storage means for storing a function of the amount of change in the front wheel cylinder pressure that relates to the front wheel cylinder pressure in order to determine the brake condition,
    wherein the determining means determines that, when the state determined by the detected front wheel cylinder pressure and amount of change in the front wheel cylinder pressure is in a region that exceeds a boundary demarcated by the function, the state corresponds to the brake condition, the function including at least one negative gradient section where the amount of change in the wheel cylinder pressure decreases with respect to an increase in the front wheel cylinder pressure.

8. The brake control device according to claim 7, wherein the function includes two or more of the negative gradient sections that are respectively different.

9. The brake control device according to claim 8, wherein the section demarcated by a region of the front wheel cylinder pressure that is higher of the two or more negative gradient sections has a decrease gradient that is steeper than that of the section demarcated by a region of the front wheel cylinder pressure that is lower.

10. The brake control device according to claim 7, wherein when the front wheel cylinder pressure is equal to or less than a first threshold, a step of reducing the increase of the front wheel cylinder pressure is not executed regardless of the amount of change in the front wheel cylinder pressure.

11. The brake control device according to claim 7, wherein the function includes a constant gradient section where, when the front wheel cylinder pressure is equal to or greater than a second threshold, the amount of change in the front wheel cylinder pressure becomes constant with respect to an increase in the front wheel cylinder pressure.

12. The brake control device according to claim 7, wherein the brake control means reduces the pressure amplification gradient of the front wheel cylinder pressure as the limit of the increase of the front wheel cylinder pressure.

* * * * *

UNITED STATES PATENT AND TRADEMARK OFFICE
CERTIFICATE OF CORRECTION

PATENT NO. : 8,290,678 B2  
APPLICATION NO. : 12/528389  
DATED : October 16, 2012  
INVENTOR(S) : Helge Westerfeld, Takahiro Ogawa and Markus Hamm Page 1 of 1

It is certified that error appears in the above-identified patent and that said Letters Patent is hereby corrected as shown below:

Title page, item (73) Assignees:

add --Bayerische Motoren Werke Aktiengesellschaft, Muenchen, Germany--

Signed and Sealed this  
Twenty-eighth Day of May, 2013

Teresa Stanek Rea  
*Acting Director of the United States Patent and Trademark Office*